Patented July 11, 1933

1,917,442

UNITED STATES PATENT OFFICE

WILHELM FITZKY, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

WATER-INSOLUBLE AZO DYESTUFF AND FIBER DYED THEREWITH

No Drawing. Application filed February 14, 1929, Serial No. 340,023, and in Germany February 18, 1928.

My present invention relates to new water-insoluble azo dyestuffs and to fiber dyed therewith.

I have found that water-insoluble azo dyestuffs of especially good properties are obtained by coupling a diazo compound of the benzene series, containing at least one negative group, with the hitherto unknown 2.3-hydroxynaphthoyl-4′-alkoxy-1′-naphthylamines. The dyestuffs obtained thereby are distinguished, besides by other good qualities, by their remarkable fastness to light. They can be produced in substance or on the fiber.

The following examples serve to illustrate my invention but are not intended to limit it thereto;

(1) 50 g. of boiled cotton yarn are treated for half an hour with the following grounding liquor:

4.5 g. of 2.3 hydroxynaphthoyl-4′-methoxy-1′-naphthylamine
9 ccm. of Turkey-red oil of 50 per cent. strength
13.5 ccm. of caustic soda solution 34° Bé., the whole made up to
1 liter
4.5 ccm. of formaldehyde of 30 per cent strength.

The material is then thoroughly freed from water by centrifuging or squeezing it and subsequently treated for half an hour in the following dye bath:

1.68 g. of 4-nitro-2-methoxy-1-aminobenzene are diazotized in known manner with
2.6 ccm. of hydrochloric acid 22° Bé. and
0.75 g. of dissolved sodium nitrite. There are added sodium acetate until there is a neutral reaction towards Congo paper and
25 g. of sodium chloride; the whole is made up to
1 liter The material is subsequently washed, soaped at boiling temperature with 2 g. of soap and 3 g. of sodium carbonate per liter and finally washed again and dried.

The dyestuff has the following formula:

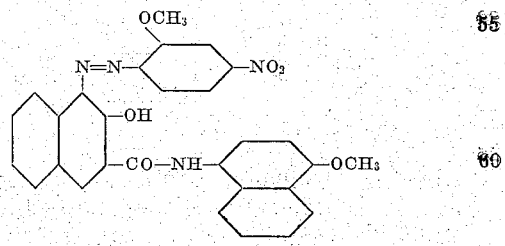

and yields a beautiful garnet dyeing of excellent fastness to light.

(2) 50 g. of boiled cotton yarn are treated with the grounding liquid described in Example 1 and dyed in the following dye bath:

1.42 g. of 4-chloro-2-amino-1-methylbenzene are diazotized in known manner with
2.6 ccm. of hydrochloric acid 22° Bé. and
0.75 g. of dissolved sodium nitrite while cooling with ice. There are added sodium acetate until there is a neutral reaction towards Congo paper and
25 g. of sodium chloride; the whole is made up to
1 liter Thus a claret red dyeing is obtained of good fastness to light and kier-boiling.

(3) The diazo compound obtainable in the usual manner from 16.8 parts of 4-nitro-2-methoxy-1-aminobenzene is run, while thoroughly stirring, in an aqueous suspension of 36 parts of 2.3-hydroxynaphthoyl-4′-methoxy-1′-naphthylamine obtainable by dissolving the latter in diluted caustic soda solution and precipitating with diluted acetic acid. The dyestuff is precipitated in the form of bluish claret flakes. When the coupling is complete, it is filtered with suction and washed in a neutral solution. The dyestuff has the formula shown in Example 1.

*Table of other combinations*

| Diazo compound of the base | Grounding liquor | Shade |
|---|---|---|
| 2.5-dichloro-1-aminobenzene | 2.3-hydroxynaphthoyl-4′-methoxy-1′-naphthylamine | Reddish brown. |
| 5-chloro-2-amino-1-methylbenzene | 2.3-hydroxynaphthoyl-4′-methoxy-1′-naphthylamine | Claret. |
| 5-nitro-2-amino-1-methylbenzene | 2.3-hydroxynaphthoyl-4′-methoxy-1′-naphthylamine | Claret. |
| 3-nitro-4-amino-1-methylbenzene | 2.3-hydroxynaphthoyl-4′-methoxy-1′-naphthylamine | Claret. |
| 2.6-dichloro-4-amino-1.3-dimethylbenzene | 2.3-hydroxynaphthoyl-4′-methoxy-1′-naphthylamine | Claret. |
| 3-nitro-4-amino-1-methoxybenzene | 2.3-hydroxynaphthoyl-4′-methoxy-1′-naphthylamine | Garnet. |

I claim:

1. As new products the water-insoluble azo dyestuffs of the following general formula:

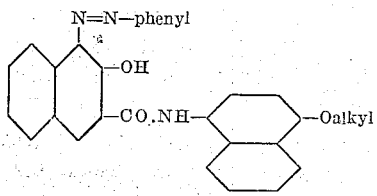

wherein the phenyl residue must contain at least one halogen or a nitro group which dyestuffs yield reddish-brown to garnet dyeings of a remarkable fastness to light.

2. As new products the water-insoluble azo dyestuffs of the following formula:

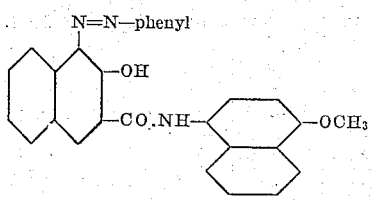

wherein the phenyl residue must contain at least one halogen or a nitro group which dyestuffs yield reddish-brown to garnet dyeings of a remarkable fastness to light.

3. As new products the water-insoluble azo dyestuffs of the following formula:

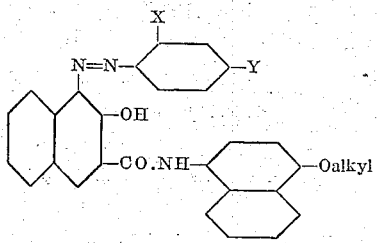

wherein X and Y stand for the substituents $CH_3$, $OCH_3$, $NO_2$, Cl, it being necessary that in one of the positions X or Y there stands always $NO_2$ or Cl, which dyestuffs yield reddish-brown to garnet dyeings of a remarkable fastness to light.

4. As new products the water-insoluble azo dyestuffs of the following formula:

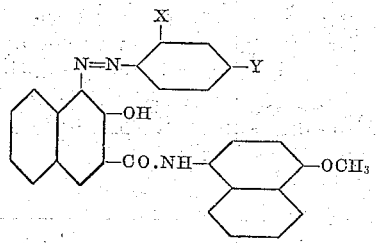

wherein X and Y stand for the substituents $CH_3$, $OCH_3$, $NO_2$, Cl, it being necessary that in one of the positions X or Y there stands always $NO_2$ or Cl, which dyestuffs yield reddish-brown to garnet dyeings of a remarkable fastness to light.

5. As a new product the water-insoluble azo dyestuff of the following formula:

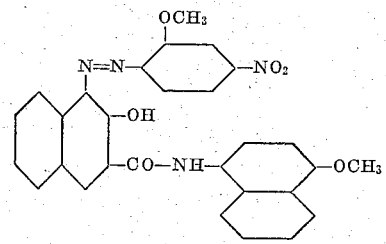

which yields, when produced on the fiber, a beautiful garnet of great fastness to light and which forms, when produced in substance and dried, a bluish-claret powder.

6. As new products, the water-insoluble azo dyestuffs of the following formula:

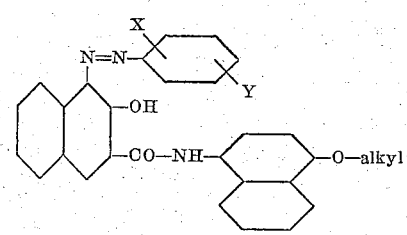

wherein X and Y stand for the substituents $CH_3$, $OCH_3$, $NO_2$, Cl, it being necessary that either X or Y means $NO_2$ or Cl, which dyestuffs yield reddish-brown dyeings of a remarkable fastness to light.

7. As new products, the water-insoluble azo dyestuffs of the following formula:

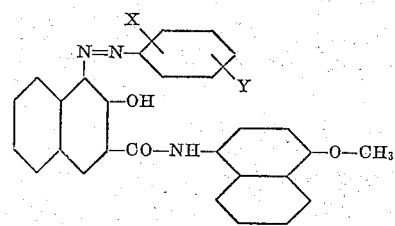

wherein X and Y stand for the substituents $CH_3$, $OCH_3$, $NO_2$, Cl, it being necessary that either X or Y means $NO_2$ or Cl, which dyestuffs yield reddish-brown dyeings of a remarkable fastness to light.

8. As a new product, the water-insoluble azo dyestuff of the following formula:

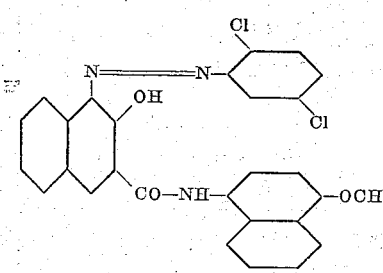

which yields, when produced on the fiber, a reddish green tint of great fastness to light.

9. As a new product, the water-insoluble azo dyestuff of the following formula:

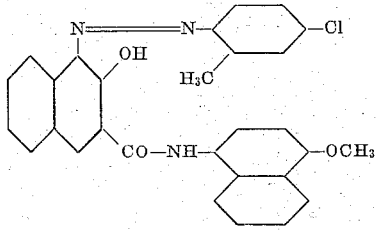

which yields, when produced on the fiber, a claret tint of great fastness to light.

10. Fiber dyed with the azo dyestuffs as claimed in claim 1.

11. Fiber dyed with the azo dyestuffs as claimed in claim 2.

12. Fiber dyed with the azo dyestuffs as claimed in claim 3.

13. Fiber dyed with the azo dyestuffs as claimed in claim 4.

14. Fiber dyed with the azo dyestuff as claimed in claim 5.

15. Fiber dyed with the azo dyestuffs as claimed in claim 6.

16. Fiber dyed with the azo dyestuffs as claimed in claim 7.

17. Fiber dyed with the azo dyestuff as claimed in claim 8.

18. Fiber dyed with the azo dyestuff as claimed in claim 9.

In testimony whereof, I affix my signature.

WILHELM FITZKY.